United States Patent
Hallowell et al.

(10) Patent No.: US 8,315,921 B2
(45) Date of Patent: Nov. 20, 2012

(54) VEHICLE CO-LISTING SYSTEMS AND METHODS

(75) Inventors: Zachary Emerson Hallowell, San Francisco, CA (US); Susan Benson Thomas, Mesa, AZ (US); Clarence Joseph Hammond, Fremont, CA (US)

(73) Assignee: Openlane, Inc., Redwood City, CA (US)

( * ) Notice: Subject to any disclaimer, the term of this patent is extended or adjusted under 35 U.S.C. 154(b) by 1187 days.

(21) Appl. No.: 11/681,729

(22) Filed: Mar. 2, 2007

(65) Prior Publication Data
US 2007/0250396 A1 Oct. 25, 2007

Related U.S. Application Data

(60) Provisional application No. 60/743,406, filed on Mar. 3, 2006.

(51) Int. Cl.
*G06Q 30/00* (2006.01)
(52) U.S. Cl. .................. 705/27.1; 705/26.1; 705/14.62; 705/37
(58) Field of Classification Search .............. 705/26, 705/27, 14, 37
See application file for complete search history.

(56) References Cited

U.S. PATENT DOCUMENTS

| | | | |
|---|---|---|---|
| 4,774,664 A | 9/1988 | Campbell et al. |
| 5,764,628 A | 6/1998 | Davis et al. |
| 5,774,873 A | 6/1998 | Berent et al. |
| 5,794,219 A | 8/1998 | Brown |
| 5,812,070 A | 9/1998 | Tagami et al. |
| 5,818,914 A | 10/1998 | Fujisaki |
| 5,835,236 A | 11/1998 | Barbari |
| 5,835,896 A | 11/1998 | Fisher et al. |
| 5,856,931 A | 1/1999 | McCasland |
| 5,857,159 A | 1/1999 | Dickrell et al. |
| 5,890,138 A | 3/1999 | Godin et al. |
| 5,905,974 A | 5/1999 | Fraser et al. |
| 5,905,975 A | 5/1999 | Ausubel |
| 5,915,209 A | 6/1999 | Lawrence |

(Continued)

FOREIGN PATENT DOCUMENTS

WO WO2007/009003 A2 1/2007

(Continued)

OTHER PUBLICATIONS

FluentMedia: "FluentMedia to delivery premium news content to airline passengers via the Verizon airfone JetConnect Service," PR Newswire, Sep. 24, 2002; Proquest #190988581, 3pgs.*

(Continued)

*Primary Examiner* — Robert M. Pond
(74) *Attorney, Agent, or Firm* — Gregory & Sawrie LLP

(57) ABSTRACT

An embodiment of the invention is directed to a method for computer network-based sale of vehicles. An access group data structure is created. The access group data structure includes structure that defines association of web sites, users and vehicles associated with an access group. Whether vehicles are visible on respective web sites is controlled based on the access group, and access by the user is allowed to respective items in the access group based on whether a user is associated with the access group. Another embodiment includes providing an access group object, wherein the access group object includes properties that define association of web sites, users and vehicles associated with an access group. Another embodiment is directed to a computerized system for vehicle sale including a web server.

22 Claims, 12 Drawing Sheets

U.S. PATENT DOCUMENTS

| | | | |
|---|---|---|---|
| 5,966,699 A | 10/1999 | Zandi | |
| 5,978,776 A | 11/1999 | Seretti et al. | |
| 6,006,148 A | 12/1999 | Strong | |
| 6,006,201 A * | 12/1999 | Berent et al. | 705/27 |
| 6,012,045 A | 1/2000 | Barzilai et al. | |
| 6,021,398 A | 2/2000 | Ausubel | |
| 6,023,685 A | 2/2000 | Brett et al. | |
| 6,023,687 A | 2/2000 | Weatherly et al. | |
| 6,026,163 A | 2/2000 | Micali | |
| 6,038,597 A | 3/2000 | Van Vyngarden | |
| 6,041,310 A | 3/2000 | Green et al. | |
| 6,049,784 A | 4/2000 | Weatherly et al. | |
| 6,055,518 A | 4/2000 | Franklin et al. | |
| 6,061,789 A | 5/2000 | Hauser et al. | |
| 6,151,589 A | 11/2000 | Aggarwal et al. | |
| 6,161,099 A | 12/2000 | Harrington et al. | |
| 6,167,384 A | 12/2000 | Graff | |
| 6,202,051 B1 | 3/2001 | Woolston | |
| 6,243,691 B1 | 6/2001 | Fisher et al. | |
| 6,266,652 B1 | 7/2001 | Godin et al. | |
| 6,269,395 B1 | 7/2001 | Blatherwick et al. | |
| 6,292,788 B1 | 9/2001 | Roberts et al. | |
| 6,298,333 B1 | 10/2001 | Manzi et al. | |
| 6,347,302 B1 | 2/2002 | Joao | |
| 6,381,587 B1 | 4/2002 | Guzelsu | |
| 6,385,730 B2 | 5/2002 | Garrison | |
| 6,397,337 B1 | 5/2002 | Garrett et al. | |
| 6,397,356 B1 | 5/2002 | Yonezawa | |
| 6,430,488 B1 | 8/2002 | Goldman et al. | |
| 6,449,601 B1 | 9/2002 | Friedland et al. | |
| 6,470,324 B1 | 10/2002 | Brown et al. | |
| 6,480,854 B1 | 11/2002 | Gross et al. | |
| 6,502,080 B1 | 12/2002 | Eichorst et al. | |
| 6,529,952 B1 | 3/2003 | Blumenau | |
| 6,539,482 B1 | 3/2003 | Blanco et al. | |
| 6,560,580 B1 | 5/2003 | Fraser et al. | |
| 6,606,608 B1 | 8/2003 | Bezos et al. | |
| 6,609,108 B1 | 8/2003 | Pulliam et al. | |
| 6,611,728 B1 | 8/2003 | Morioka et al. | |
| 6,622,129 B1 | 9/2003 | Whitworth | |
| 6,678,731 B1 | 1/2004 | Howard et al. | |
| 6,694,365 B1 | 2/2004 | Wyngarden | |
| 6,697,806 B1 | 2/2004 | Cook | |
| 6,725,201 B2 | 4/2004 | Joao | |
| 6,735,573 B1 | 5/2004 | Gelman et al. | |
| 6,745,225 B2 | 6/2004 | Loh et al. | |
| 6,751,546 B2 | 6/2004 | Yamashita | |
| 6,754,564 B2 | 6/2004 | Newport | |
| 6,768,935 B1 | 7/2004 | Morgan et al. | |
| 6,785,658 B1 | 8/2004 | Merker et al. | |
| 6,813,612 B1 | 11/2004 | Rabenold et al. | |
| 6,819,218 B2 | 11/2004 | Mabuchi et al. | |
| 6,865,566 B2 | 3/2005 | Serrano-Morales et al. | |
| 6,920,433 B1 | 7/2005 | Seretti et al. | |
| 6,980,963 B1 | 12/2005 | Hanzek | |
| 7,103,568 B1 | 9/2006 | Fusz et al. | |
| 7,363,246 B1 | 4/2008 | Van Horn et al. | |
| 7,409,361 B2 | 8/2008 | Dinwoodie | |
| 7,430,517 B1 | 9/2008 | Barton | |
| 7,480,550 B2 | 1/2009 | Huber et al. | |
| 7,908,180 B2 | 3/2011 | Goclowski | |
| 7,921,052 B2 | 4/2011 | Dabney et al. | |
| 2001/0044751 A1 | 11/2001 | Pugliese et al. | |
| 2001/0056396 A1 | 12/2001 | Goino | |
| 2002/0002475 A1 | 1/2002 | Freedman | |
| 2002/0023537 A1 | 2/2002 | Ridgeway et al. | |
| 2002/0049663 A1 | 4/2002 | Kahana | |
| 2002/0082978 A1 | 6/2002 | Ghouri et al. | |
| 2002/0111877 A1 | 8/2002 | Nelson | |
| 2002/0143646 A1 | 10/2002 | Boyden et al. | |
| 2002/0186144 A1 | 12/2002 | Meunier | |
| 2003/0004806 A1 | 1/2003 | Vaitekunas | |
| 2003/0036964 A1 | 2/2003 | Boyden et al. | |
| 2003/0120509 A1 | 6/2003 | Bruch et al. | |
| 2003/0130952 A1 * | 7/2003 | Bell et al. | 705/51 |
| 2003/0158806 A1 | 8/2003 | Hanley et al. | |
| 2004/0107160 A1 | 6/2004 | Goclowski | |
| 2004/0117293 A1 | 6/2004 | Lammle et al. | |
| 2004/0128224 A1 | 7/2004 | Dabney et al. | |
| 2004/0172266 A1 | 9/2004 | Sheinson et al. | |
| 2005/0021444 A1 | 1/2005 | Bauer et al. | |
| 2005/0038758 A1 | 2/2005 | Hilbush et al. | |
| 2005/0065853 A1 | 3/2005 | Ferreira | |
| 2005/0080712 A1 | 4/2005 | Bauer et al. | |
| 2005/0125330 A1 | 6/2005 | Dinwoodie | |
| 2005/0228736 A1 | 10/2005 | Norman et al. | |
| 2005/0256780 A1 | 11/2005 | Eldred | |
| 2006/0074790 A1 | 4/2006 | Anspach | |
| 2006/0206408 A1 | 9/2006 | Nassiri | |
| 2006/0265235 A1 | 11/2006 | Schuchardt et al. | |
| 2007/0179860 A1 | 8/2007 | Romero | |
| 2007/0226081 A1 | 9/2007 | Vilcauskas et al. | |
| 2008/0300962 A1 | 12/2008 | Cawston et al. | |
| 2009/0048942 A1 | 2/2009 | Bouwens et al. | |

FOREIGN PATENT DOCUMENTS

| | | |
|---|---|---|
| WO | WO2007/009003 A3 | 1/2007 |

OTHER PUBLICATIONS iSyndicate: "iSyndicate launches content manager—empowering customers with complete control over the content on the their site," Business Wire, Jul. 10, 2000; Proquest #56285089, 3pgs.*

Form PCT/ISA/220, PCT/US06/27088, "PCT Notification of Transmittal of the International Search Report and the Written Opinion of the International Searching Authority, or the Declaration," 1 pg.

Form PCT/ISA/210, PCT/US06/27088, "PCT International Search Report," 2 pgs.

Form PCT/ISA/237, PCT/US06/27088, "PCT Written Opinion of the International Searching Authority," 4 pgs.

Form PCT/IB/373, PCT/US06/27088, "PCT International Preliminary Report on Patentability," 1 pg.

Collins English Dictionary, Harper Collins Publishing 2000.

UPS Domestic Delivery Area Surcharge: http://web.archive.org/web/20050404012352/www.ups.com/content/us/en/shipping/cost/zones/on_demand.html (dated Apr. 4, 2005; Domestic Delivery Area Surcharge Chart dated Jan. 3, 2005) [retrieved from Internet Archive on Dec. 14, 2009].

UPS Payment Methods: http://web.archive.org/web/20050519002823/www.ups.com/content/us/en/resources/pay/methods.html (dated May 19, 2005) [retrieved from Internet Archive on Dec. 15, 2009].

AutoTradeCenter, 2004: http://web.archive.org/web/20050125180848/http://autotradecenter.com/.

PCT/US10/37797; PCT/ISA/220 "Notification of Transmittal of the International Search Report and the Written Opinion of the International Searching Authority, or the Declaration," 1 pg.

PCT/US10/37797; PCT/ISA/210 "International Search Report," 2 pgs.

PCT/US10/37797; PCT/ISA/237 "Written Opinion of the International Searching Authority," 5 pgs.

Form PCT/ISA/220, PCT/US10/25759, "PCT Notification of Transmittal of the International Search Report and the Written Opinion of the International Searching Authority, or the Declaration," 1 pg.

Form PCT/ISA/210, PCT/US10/25759, "PCT International Search Report," 2 pgs.

Form PCT/ISA/237, PCT/US10/25759, "PCT Written Opinion of the International Searching Authority," 8 pgs.

* cited by examiner

FIG. 5

| | | Zach Hallowell, TEST BUYER, Chicago, IL |
|---|---|---|
| ATC | | Sunday, November 06, 2005, 5:52 PM PST |
| | | Condition Report |

MY AUCTION
My Auction
Open Purchases
Vehicles Purchased
Auctions Closed
Vehicles Returned
Real Time Events

FIND VEHICLES
PREFERENCES
HELP
LOG OUT

| Bid on This Vehicle | | Buy This Vehicle |
|---|---|---|
| Current Bid: $14,000 | Reserve Not Met | |
| Minimum Bid: $14,000* $[ ] | ● Hard Bid  ○ Proxy Bid  (BID) | $14,350* (BUY) |
| Auction closes in 14 hrs 7 mins *does not include buy or transportation fees. | Buy Fee: $165 View: Purchase Rules | |
| Transportation Options: (Select after pressing bid or buy) Buyer or ATC arranged | Title and Payment: Settle with Partner | |

CONDITION SUMMARY

| | |
|---|---|
| Vehicle | 2004 Jeep Grand Cherokee LAREDO Wagon |
| VIN | 1J4GW48S94C130187 |
| Frame Damage | No |
| Odometer Condition | Functions Properly |
| Inspection Company | INSPECTION SOLUTIONS |
| Inspection Date | 10-31-2005 |

Vehicle is in 3 - Average condition.
Original lessee obtains the right to remove aftermarket items and replace original equipment prior to lease return. Vehicles are priced and sold according to original factory trim, packages and equipment.
Vehicle has less than $ 1000 billable damage (as measured by Mitchell Brothers guide). Per Chrysler Financial rules, damage that encompasses area smaller than a credit card is not billed in this condition report.

DAMAGE DESCRIPTIONS

| Region/Area | Type | Estimate | Description |
|---|---|---|---|
| Exterior | | | |
| Unknown | PREV REPAIR | $0 | RF Fender Prev Repair No Action Required Acceptable |
| Unknown | ding | $50 | LF Door Ding PDR PDR/2 |
| Unknown | PREV REPAIR | $0 | LR Door Prev Repair No Action Required Acceptable |
| Unknown | PREV REPAIR | $0 | L Qtr Panel Prev Repair No Action Required Acceptable |
| Unknown | PREV REPAIR | $0 | RF Door Prev Repair No Action Required Acceptable |
| Unknown | PREV REPAIR | $0 | RR Door Prev Repair No Action Required Acceptable |
| Unknown | PREV REPAIR | $0 | R Qtr Panel Prev Repair No Action Required Acceptable |
| Lift Gate | PREV REPAIR | $0 | No Action Required Acceptable |
| Rear Bumper Cover | PREV REPAIR | $0 | No Action Required Acceptable |
| Windshield | Cracked | $97 | Replace Replacement Required |
| | Subtotal | $147 | |

FIG. 6A

| | | | |
|---|---|---|---|
| Other | | | |
| Unknown | Multiple Scratches | $0 | LF Door Multiple Scratches Refinish 1" to 1.99" |
| Unknown | Multiple Scratches | $0 | LR Door Multiple Scratches Refinish 1" to 1.99" |
| Hood | Multiple Scratches | $0 | Refinish 1" to 1.99" |
| Lift Gate | Multiple Scratches | $0 | Refinish 1" to 1.99" |
| | Subtotal | $0 | |
| Total | | $147 | |

TIRE CONDITION

| | Condition | Manufacturer |
|---|---|---|
| Left Front | 8/32 inch tread | Goodyear |
| Left Rear | 9/32 inch tread | Goodyear |
| Right Front | 8/32 inch tread | Goodyear |
| Right Rear | 9/32 inch tread | Goodyear |
| Spare | 12/32 inch tread | Goodyear |

VEHICLE PICTURE

*Based on vehicle age and mileage. Assessed by independent vehicle appraiser.

§The damage analysis is based on a comprehensive inspection by an independent vehicle appraiser. ATC takes no responsibility in assessing the actual cost of repair and reconditioning.

FIG. 6B web E.L.V.I.S.

Jon Doe, BILL BUTLER CHRYSLER DODGE JEEP, WARNER ROBBINS, GA
Sunday, November 06, 2005, 5:50 PM PST CHRYSLER FINANCIAL
A member of the DaimlerChrysler Services Group

| HOME | MY Web E.L.V.I.S. | FIND VEHICLES | PREFERENCES | HELP | LOGOUT |

Reporting
-Purchase Report
-Auctions Ahead/Behind

Pre-Sales Questions
Post-Sales Questions
Terms & Conditions
Arbitration Rules

Vehicle Detail / Condition Report
2004 Jeep Grand Cherokee LAREDO Wagon

Minimum Bid: $14,000 *
○ Hard Bid     $[        ]
◉ Proxy Bid                    ( Place Bid )

Purchase Price: $14,350 *     ( Buy Now )

*does not include buy or transportation fees.

Remaining Time: 14 hrs 9 mins
Bid Status: Reserve Not Met
Buy Fee: $165
View: Purchase Rules
Post Sale Info: Settle with Partner
Transportation: Buyer or ATC arranged Add to Watch List
View Purchase Rules

VEHICLE DESCRIPTION

| VIN | Vehicle Type | Ext. and Int. Color |
|---|---|---|
| 1J4GW48S94C130187 | Off lease | MIDNIGHT BLUE PEARL COAT with UNKNOWN interior |

| Engine | Transmission | Mileage | Drivetrain |
|---|---|---|---|
| | AUTOMATIC | 36,170 | |

LOCATION INFORMATION

| City | State |
|---|---|
| Detroit | MI |

TRANSPORTATION

| Options | ETA* | Transport Cost |
|---|---|---|
| -Buyer arranges and pays for transport following sale | | |
| -Have ATC arrange transportation | 14 days | $615 |
| for you | | |

*Based on selected shipping location. Estimated time for delivery is from date payment is received.
**Single haul rate; call your Online Sales Representative for same day multiple vehicle haul quote from this location.

EQUIPMENT
- AM/FM RADIO
- ALLOY WHEELS
- CRUISE CONTROL
- POWER WINDOWS
- AIR CONDITIONING
- POWER SEAT DRIVER
- 4WD
- AUTOMATIC
- POWER DOOR LOCKS
- POWER STEERING
- TILT WHEEL
- ABS
- AIR BAG
- SECURITY SYSTEM
- POWER MIRRORS
- REAR DEFROSTER
- CLOTH SEATS
- CUSTOMER PREFERRED PACKAGE 26T
- ANTI-LOCK BRAKES
- TINTED GLASS
- POWER OUTLETS
- VANITY MIRROR - DRIVER
- INTERMITTENT WIPERS
- REAR SEAT PASS THROUGH

ANNOUNCEMENTS

Condition Report Summary

| Inspection Company | Inspection Date | Frame Damage |
|---|---|---|
| INSPECTION SOLUTIONS | 10-31-2005 | No |

| Odometer | Mileage |
|---|---|
| Functions Properly | 36,171 |

Labor Charge Rates

| General Rate | Paintless Dent Repair Rate | Mechanical Rate | Metal Rate | Paint Rate |
|---|---|---|---|---|
| 0 | 0 | 0 | 0 | 0 |

Vehicle Photos

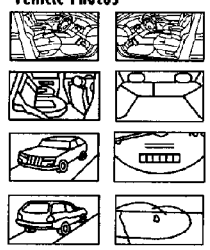

FIG. 7A

Tire Condition

| | Tread Depth | Manufacturer |
|---|---|---|
| Left Front | 8/32 inch tread | Goodyear |
| Left Rear | 9/32 inch tread | Goodyear |
| Right Front | 8/32 inch tread | Goodyear |
| Right Rear | 9/32 inch tread | Goodyear |
| Spare | 12/32 inch tread | Goodyear |

Inspection Comments

Vehicle is in 3 – Average condition.
Original lessee obtains the right to remove aftermarket items and replace original equipment prior to lease return. Vehicles are priced and sold according to original factory trim, packages and equipment.
Vehicle has less than $ 1000 billable damage (as measured by Mitchell Brothers guide). Per Chrysler Financial rules, damage that encompasses area smaller than a credit card is not billed in this condition report.

Damage Descriptions

| Damage Area | Description | Parts Total DescCost |
|---|---|---|
| Unknown | PREV REPAIR - RF Fender Prev Repair No Action Required Acceptable | $0 |
| Unknown | ding - LF Door Ding PDR PDR/2 | $50 |
| Unknown | PREV REPAIR - LR Door Prev Repair No Action Required Acceptable | $0 |
| Unknown | PREV REPAIR - L Qtr Panel Prev Repair No Action Required Acceptable | $0 |
| Unknown | PREV REPAIR - RF Door Prev Repair No Action Required Acceptable | $0 |
| Unknown | PREV REPAIR - RR Door Prev Repair No Action Required Acceptable | $0 |
| Unknown | PREV REPAIR - R Qtr Panel Prev Repair No Action Required Acceptable | $0 |
| Lift Gate | PREV REPAIR - No Action Required Acceptable | $0 |
| Rear Bumper Cover | PREV REPAIR - No Action Required Acceptable | $0 |
| Windshield | Cracked - Replace Replacement Required | $97 |
| Unknown | Multiple Scratches - LF Door Multiple Scratches Refinish 1" to 1.99" | $0 |
| Unknown | Multiple Scratches - LR Door Multiple Scratches Refinish 1" to 1.99" | $0 |
| Hood | Multiple Scratches - Refinish 1" to 1.99" | $0 |
| Lift Gate | Multiple Scratches - Refinish 1" to 1.99" | $0 |

Go to the ATC Open Auction

FIG. 7B

VEHICLE CO-LISTING SYSTEMS AND METHODS

CROSS-REFERENCE

This application claims the benefit of U.S. Provisional Application No. 60/743,406, filed Mar. 3, 2006, which application is incorporated herein by reference.

BACKGROUND OF THE INVENTION

Sellers of vehicles may spend considerable efforts in marketing and selling their vehicles. Recently, sellers have used electronic communications and computer networks to market their vehicles to buyers. However, notwithstanding the availability of communications and computer technology, the process of making a vehicle available to a distributed group of buyers can be time consuming, and imperfect. Accordingly, there is a need for improved methods and systems relative to computer-assisted vehicle sale.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 5 shows a user interface with vehicle detail on a first web site, according to an embodiment of the invention.

FIGS. 6A and 6B show a user interface with a condition report, according to an embodiment of the invention.

FIGS. 7A and 7B show a user interface with vehicle detail on a second web site, according to an FIG. 8 is a block diagram of a system with a bidding tool, according to an embodiment of the invention.

DETAILED DESCRIPTION OF THE INVENTION

Figure 1A:
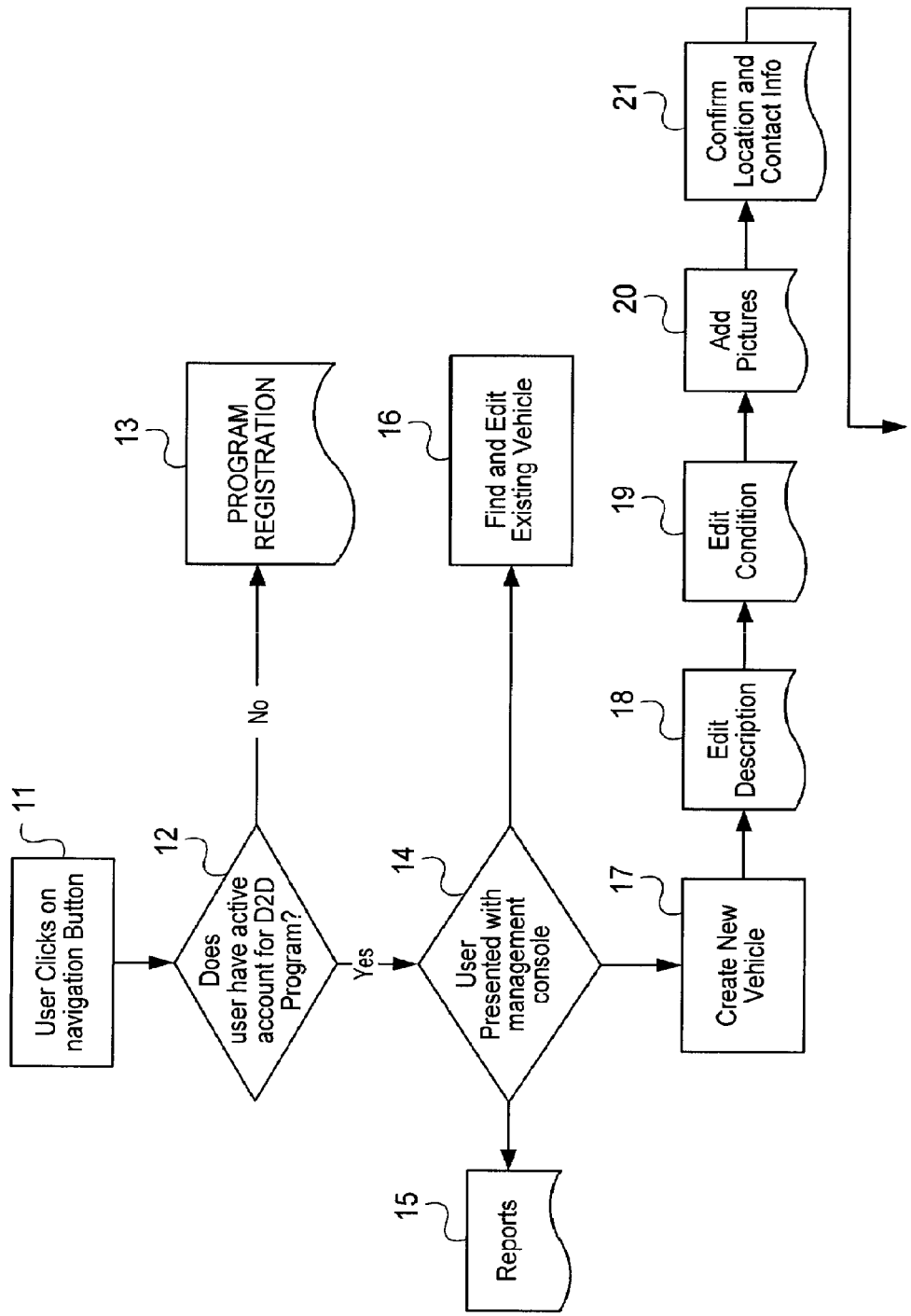
FIGS. 1A and 1B show a flow diagram for a vehicle creation process, according to an embodiment of the invention.

While preferred embodiments of the present invention have been shown and described herein, embodiments are provided by way of example only. Numerous variations, changes, and substitutions are possible without departing from the invention. It should be understood that various alternatives to the embodiments of the invention described herein may be employed in practicing the invention.

An embodiment of the invention is directed to a dealer-to-dealer vehicle sale program with co-listing. This may be implemented as a business method, software and/or hardware system and/or methods or combinations of the foregoing. Embodiments may allow an automobile dealer to register for a dealer-to-dealer program on a private marketplace web site and/or an open auction web site, list the vehicle for sale to multiple sites and to allow other dealers to purchase the listed vehicles from other dealers Co-listing may provide a method of allowing an automobile dealer to offer a vehicle simultaneously for viewing and sale on two (or more) distinct web sites, accessible via personal computer, hand-held device or other device or computer. Vehicle visibility may be managed by a system that contains a configurable grouping mechanism, which allows for control over which sites the vehicle is visible on at any given time.

A dealer-to-dealer co-listing method may include various aspects of the following alone or in various combinations:

Environment

A host computer network, which serves the web sites on which the vehicle is available for viewing and purchase. The web sites may be "branded" differently (their appearance may differ) and have different URLs.

A host database, which contains detailed description of the vehicle, its configuration and condition.

A set of user modules, which provide for varying levels of permissions to access to the vehicle data.

Administration Module

An interface for creating a grouping object (referred to as an access group to which sites, users and vehicles can be associated).

An interface for linking the grouping object to vehicles.

An interface for linking the grouping object to sites.

An interface for linking the grouping object to users.

An interface for setting the user permission for accessing the site and vehicles.

A module for controlling the vehicle's lifecycle (length of time for sale and access groups to which the vehicle will be visible during each iteration).

Dealer Module

A dealer module may contain various functions, alone or in various combinations that are available to users, who are typically vehicle dealers. Some of the functions are particularly used by dealers as sellers and others are used by dealers as buyers.

An interface for accessing the system (username, password).

A control for searching for the vehicles.

An interface for viewing search results.

A workflow that allows for listing of vehicles.

A control in the listing process that allows for control of the sites on which the vehicle can be co-listed.

A control in the listing process that allows the listing user to determine the prices and sale type (bidding and/or buy-only).

If bidding is available, an interface for viewing all bids placed on the vehicles from any of the sites.

A vehicle detail page, which may or may not include pictures, vehicle accessories, and condition information and pricing/purchase information. Support for bidding and buying.

A control on the detail page allowing for vehicle purchase. A selling dealer would be prevented from buying the dealer's own vehicles.

A manage listings interface, which allows a selling dealer to view and manage vehicles that have been listed for sale by the selling dealer. This interface may or may not include the ability to remove vehicles from sale, sell a vehicle immediately at the current highest bid, view page views, view confirmed bids and/or offers placed on the vehicle, view bid attempts, and view number of days the vehicle has been available for sale.

A pending listings report, for vehicles that have not yet been released for auction.

A purchase report, where the user can view all vehicles purchased by its dealership.

A sales report, where the user can view all vehicles sold by its dealership.

The vehicle creation process allows a dealer-to-dealer seller to configure a vehicle for on-line sale and to decide which sites to list the vehicle for sale. This is controlled by the settings in the dealer-to-dealer configuration. The dealer-to-dealer configuration will dictate if a vehicle is eligible for listing on the private marketplace and/or an open auction site. The dealer-to-dealer seller will only be presented with the option to list a vehicle on a particular site if the vehicle is eligible for that site, based on rules established by the site administrator.

The process for listing and accessing a vehicle may work as follows:
1. An administrator creates an access group.
2. The administrator associates the access group with one or more web sites. The sites may be hosted and administered by the system provider, or may be the property of a partner.
3. The dealer lists the vehicle and chooses to co-list the vehicle, which associates the vehicle with an access group.
   a. Note: This association between vehicle and access group may be direct, or indirect, through a "vehicle lifecycle" set for the vehicle. The lifecycle might be configured to include the new access group as one of the groups to which the vehicle will be sold during a period within the lifecycle.
4. A user associated with the access group visits one of the sites to which the vehicle has been made available.
   a. If a user is not associated with one or more of the access groups that the Web Site is associated with, they will not be able to login.
   b. Note: An administrator may perform the association between user and access group
5. Once on the web site the user is able to search for, view or buy the vehicle.
   a. Note: The users permissions may be set per each access group to which they belong.

The user may establish sales and other terms that apply particularly to an access group. For example, sales rules may be associated with a respective access group.

Figure 1B:
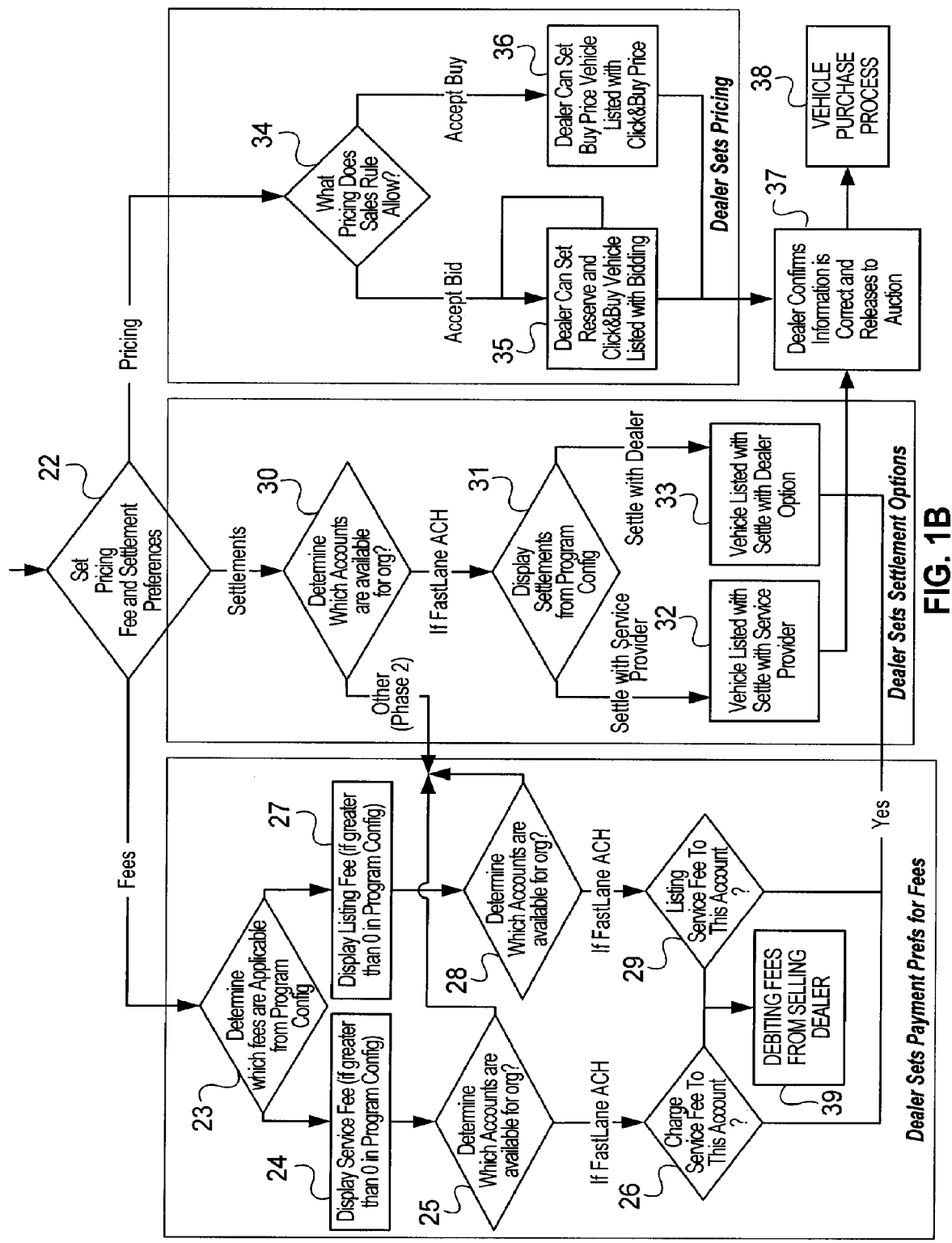

FIGS. 1A and 1B show a flow diagram for a vehicle creation process, according to an embodiment of the invention. The user may begin the process by clicking on a navigation button (block 11). If the user does not have an account for the dealer program (block 12), the user is directed to program registration (block 13). Otherwise, the user is directed to a vehicle management console (block 14). From such console, the user may select to initiate functionality for reports (block 15), find and edit existing vehicles (block 16), and create new vehicles (block 17). In creating a new vehicle, the user may edit the description of the vehicle (block 18), edit the condition of the vehicle (block 19), add pictures of the vehicle (block 20), confirm the user's location and contact information (block 21), and set pricing, fees, and settlement preferences (block 22).

Setting pricing, fees, and settlement preferences (block 22) includes functionality for the dealer to set preferences for fees, functionality for the dealer to set settlement options, and functionality for the dealer to set pricing. The functionality related to dealer setting payment preferences for fees may begin with determining which fees are applicable from the program configuration (block 23). A service fee may be displayed if it is greater than zero in the program configuration (block 24). Likewise, a listing fee may be displayed if it is greater than zero in the program configuration (block 27). In connection with displaying the service fee, it is determined which accounts are available for the organization (block 25). It is determined whether to charge a service fee to the respective account (block 26). In some circumstances, fees are debited from the selling dealer (block 39). Also in connection with display of listing fee (block 27), it is determined which accounts are available for the organization (block 28), and the respective listing service fee applicable to the respective account (block 29).

Setting dealer settlement options may commence with determining which accounts are available for the organization (block 30). The settlements from the program configuration may be displayed (block 31). If the settlement is with the system provider, the vehicle may be listed so as to be settled with the service provider (block 32). If settlements are to be made with dealer, the dealer may be listed to settle with the dealer (block 33).

Pricing may be handled with reference to determining which pricing the sales rule allows (block 34). For example, if bids are accepted, the dealer can set the reserve price and the vehicle may be listed through bidding (block 35). If buying is to be allowed, the dealer can set the buy price price and the vehicle may be listed with a buy price (block 36). After setting the respective preferences, the dealer confirms that the information is correct and releases the vehicle to auction or other buying (block 37). The vehicle is then available for a vehicle purchase process (block 38).

When a vehicle is created (for example starting with the create new vehicle block), a lifecycle (or program configuration) is set. The lifecycle contains the access groups to which the vehicle will be visible. The access groups also determine on which sites the vehicle will be visible.

The program configuration block (in the dealer sets settlement options) includes displaying settlements. The settlement is a component of a sales rule which is used in co-listing vehicles. The sales rule encapsulates the terms of sale between the users in the access group (e.g., a group of buyers) and the seller. The settlement is the portion of the sales rule relating to a description of the payment process for the access group.

The sales rule allows particular pricing for a vehicle according to access group. The pricing portion of the sales rule may determine whether the vehicle is sold to a given access group via bidding and/or buy-only.

Figure 2:
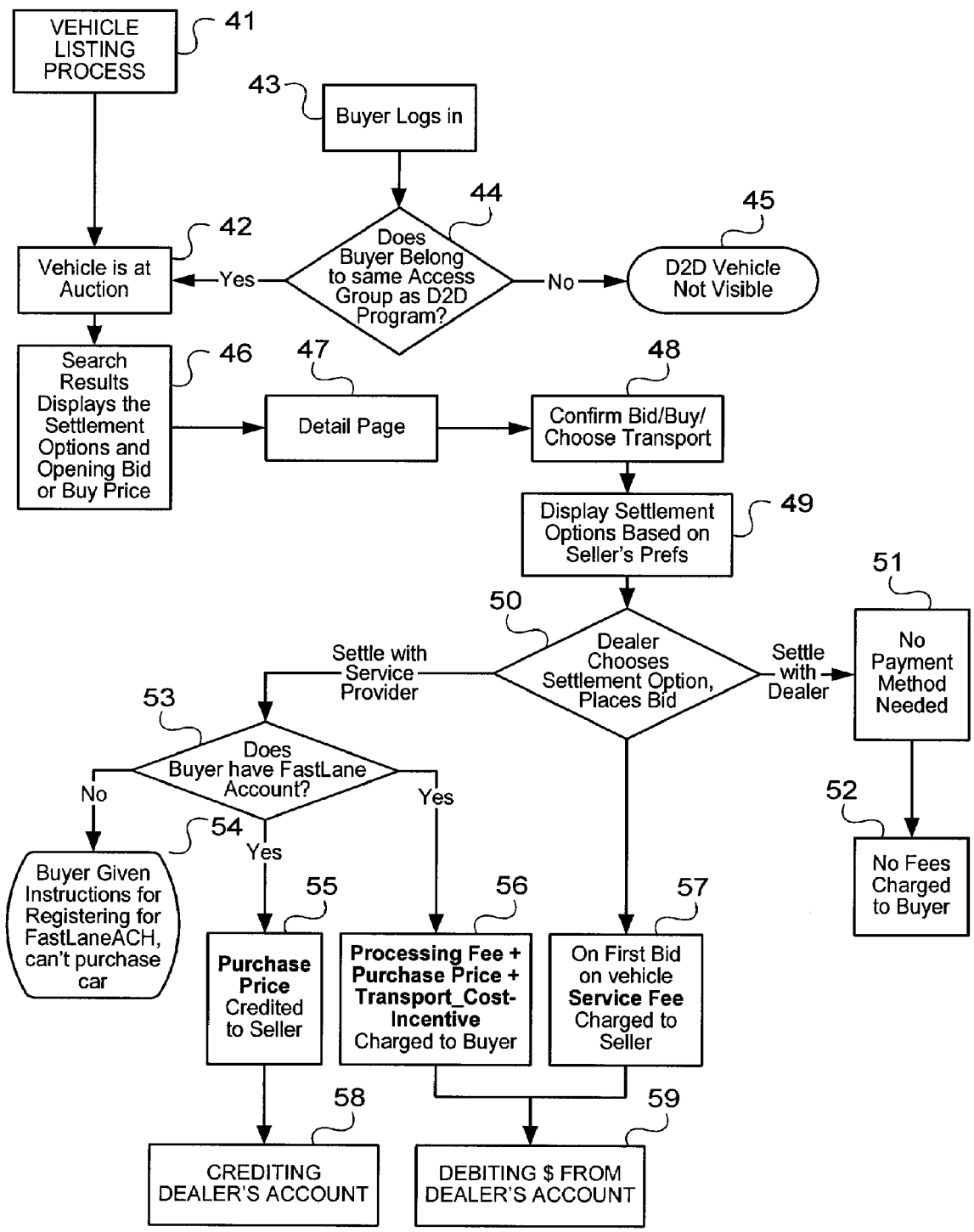
FIG. 2 is a flow diagram for a listing and purchase process, according to an embodiment of the invention.

FIG. 2 is a flow diagram for a listing and purchase process, according to an embodiment of the invention. A vehicle may start in a vehicle listing process (block 41), then go to an auction (block 42), and the respective search results may display the settlement options and opening bid or buy price (block 46).

Alternatively, a buyer may first log in (block 43), and then it is determined whether the buyer belongs to the respective access group (block 44). If the buyer does belong to the respective access group (block 44), then the vehicle is made available for purchasing, such as auction (block 42). Alternatively, if the vehicle does not belong to the respective access group (block 44), the vehicle is not visible (block 45).

Assuming the vehicle is displayed and settlement options and opening bid or buy price are provided (block 46), the vehicle is available for display with a detail page (block 47). Further, the user can confirm bidding or buying and choose transport (block 48) and will view the settlement options based on the seller's preferences (block 49). The purchasing dealer chooses the settlement option and places a bid (block 50). If the dealer chooses to settle with the dealer, no payment method is needed (block 51), and no fees are charged to the buyer (block 52).

If the dealer is to settle with the system provider, it is determined whether the buyer has an account (block 53), and if the buyer does not have an account, the buyer is given instructions for registering for an account and in the meantime cannot purchase the vehicle (block 54). If the buyer does have an account, the purchase price is credited to the seller (block 55), and the dealer's account is credited (block 58). Additionally, if the buyer has an account, a processing fee, purchase price, and transport costs minus incentive are charged to the buyer (block 56). After charging such amounts, debiting is made from the dealer's account (block 59). According to one alternative, on a first bid on a vehicle, a service fee is charged to the seller (block 57), and subsequently a respective amount is debited from the dealer's account (block 59).

As shown in the block regarding whether buyer belongs to same access group as the dealer-to-dealer (D2D) program, if the buyer does belong to the same access group as the vehicle, then the vehicle is made accessible to the buyer on the site. According to an embodiment, a search result displays the settlement options and opening bid/buy price, and the display of these values also depends on membership of the buyer, vehicle, and web site in an access group.

Figure 3:
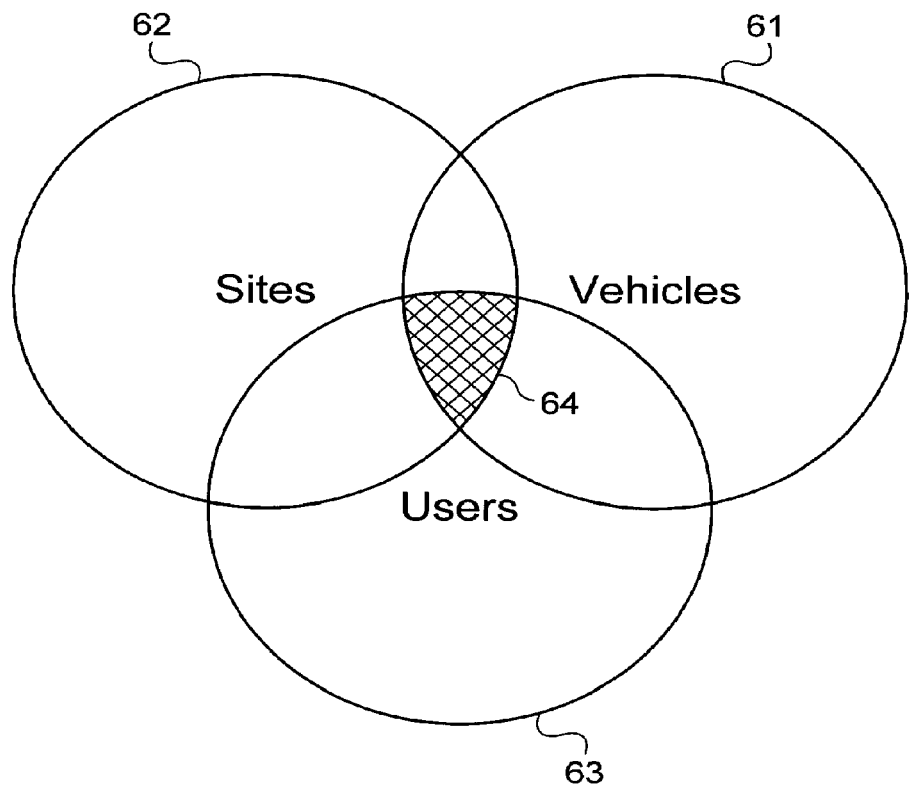
FIG. 3 is a diagram illustrating grouping, according to an embodiment of the invention.

FIG. 3 is a diagram illustrating grouping, according to an embodiment of the invention. The diagram shows vehicles 61, sites 62 and users 63. The intersection 64 of these items represents respective users that can view respective vehicles on the respective sites. Such relationship is achieved with an access group, according to an embodiment of the invention.

Figure 4:
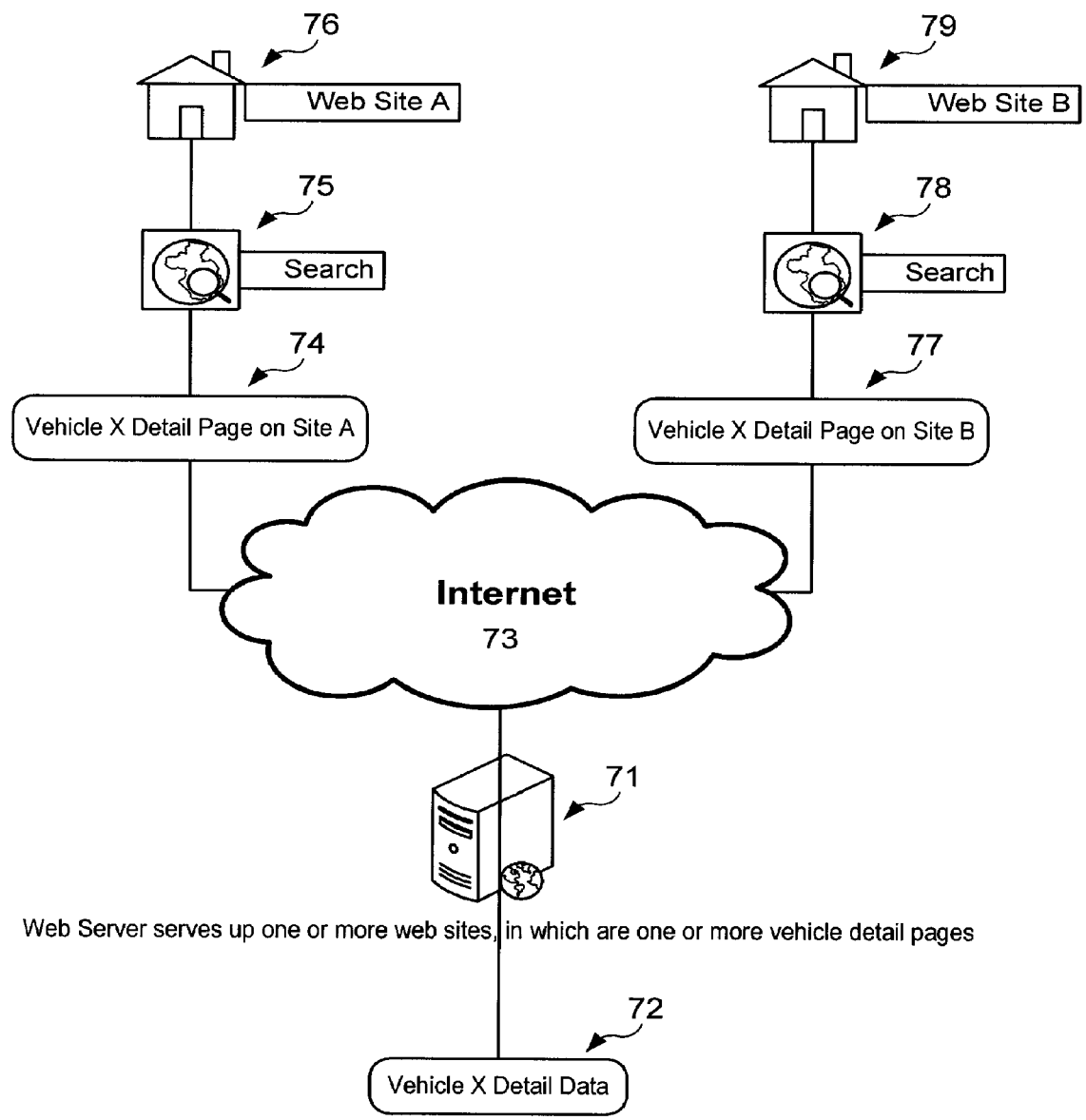
FIG. 4 is a block diagram of a co-listing system, according to an embodiment of the invention.

FIG. 4 is a block diagram of a co-listing system, according to an embodiment of the invention. The system includes a web server 71 which is coupled to multiple web sites, shown here as web site A 76 and web site B 79, through the internet 73. Web server 71 has access to database 72, which may be included within web server 71 or as an external database, which includes information about respective vehicles, shown here as vehicle X detail data 72. The vehicle information may be shown on multiple sites, such as shown here web site A 76 and web site B 79. Such vehicle detail may be shown in different format according to the respective web sites. Here, vehicle X detail page on site A 74 is shown in response to search 75 from web site A 76. Further, web site vehicle X detail page on site B 77 is shown on web site B 79 in response to search 78.

Figure 5:
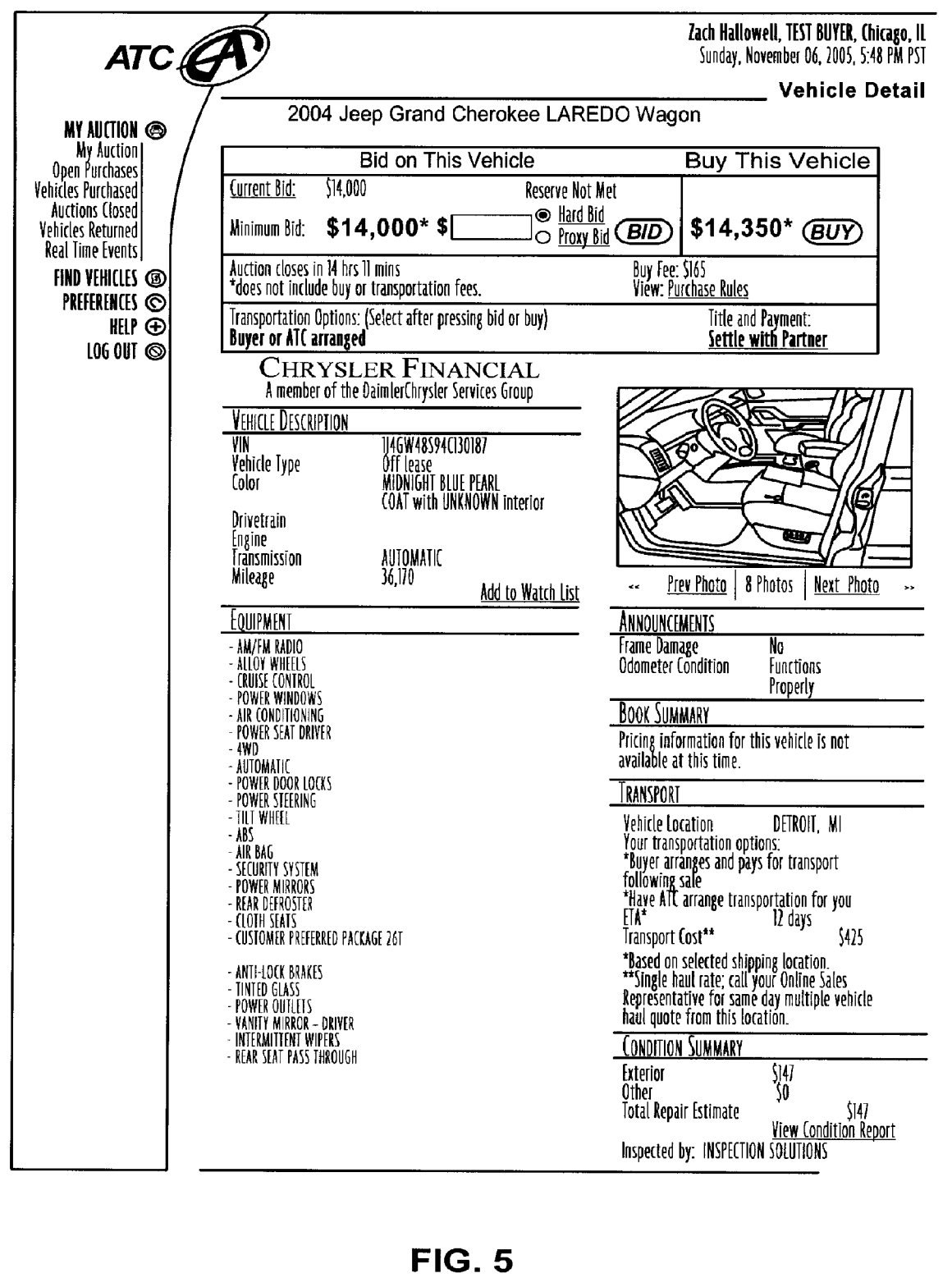

FIG. 5 shows a user interface with detail on a first web site, according to an embodiment of the invention. The following interface diagrams illustrate in part how the same vehicle may be made visible on two different sites at the same time. Various details about the vehicle are shown to communicate attributes of the vehicle and make the vehicle available for purchase. For example, the detail may include a section for bidding and a section for buying. The section for bidding may include a current bid, an option for hard bid or proxy bid, a minimum bid, a space to enter the bid, and information on the timing when the auction will close. Additionally, pricing may be provided at which the vehicle may be purchased, and a button may be provided to allow for such purchase. Vehicle description information may be provided such as: VIN, vehicle type, color, drive train, engine, transmission, and mileage. Equipment may be described, such as radio type, wheel type, cruise control, window type, air conditioning, power seat driver, steering, security system, seat type, brake type, and other details regarding the equipment of the vehicle. Additional information regarding the vehicle may be provided. Further, information regarding transfer of the vehicle may be displayed and options to arrange the transport by the system provider may be provided. A summary section may also be provided.

FIGS. 6A and 6B show a user interface with a condition report, according to an embodiment of the invention. A condition report may include a condition summary, and other information about the condition of the vehicle, such as damage descriptions, tire condition, and vehicle pictures. This page may also include an option to bid on the vehicle or buy the vehicle.

FIGS. 7A and 7B show a user interface with vehicle detail on a second web site, according to an embodiment of the invention. Thus, the same vehicle or vehicles may be listed on different web sites. The layout of the sites may be different, but the information displayed may be the same, similar, or different, according to various embodiments of the invention. According to one embodiment, the information is generally the same on the different sites, although the layout or positioning may be different according to the rules of the respective site.

Figure 8:
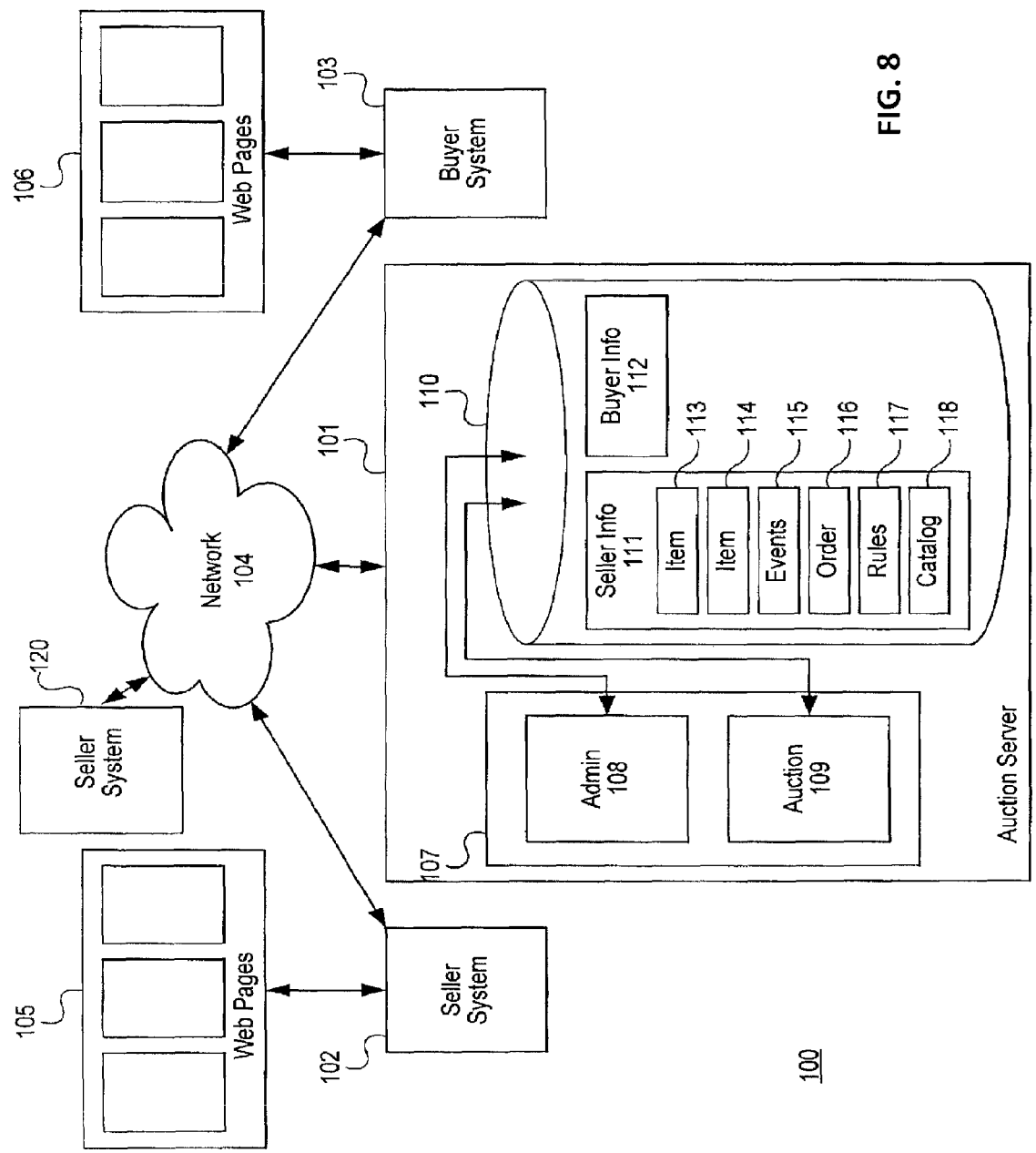

FIG. 8 is a block diagram of a system with a bidding tool, according to an embodiment of the invention. Other tools and network configurations may be used according to other embodiments of the invention. The system shown includes an auction server 101, seller system 102, seller system 120, and buyer system 103. Also shown is network 104. Seller system 102 includes web pages 105, and buyer system 103 includes web pages 106. Auction server 101 includes software 107 and storage 110. Software 107 includes administrative software 108 and auction software 109, and storage includes seller information 111 and buyer information 112. Seller information 111 includes information such as vehicle information 113 and 114, and events information 115 which includes order 116, rules 117 and catalog 118. Auction server 101 is coupled to seller system 102 and buyer system 103 via network 104. Software 107 in auction server 101 operates with storage 110.

Seller system 102 includes functionality to manage inventory (such as vehicles), set up and modify bidding events, and manage bidding events. Such functionality may be included directly in seller system 102 or may be included in auction server 101 or in a combination of software or other logic located in seller system 102 and auction server 101.

Buyer system 103 includes functionality to view catalog items for bidding, to place bids and view an auction, and to select purchase, payment and delivery options for items purchased. This functionality may be included in functionality on buyer system 103, auction server 101 and/or combination of functionality located on auction server 101 and buyer system 103. The functionality may be implemented in software, hardware, or a combination of hardware and software according to various embodiments. Thus, according to various embodiments, the implementations described herein for software may also be implemented in various configurations of software and/or hardware, in distributed or other configurations in various machines and/or networks.

Auction server 101 includes software and storage to manage options and the users of the auctions. Administrative software 108 manages users and information related to users, such as seller information 111 and buyer information 112. Auction software 109 controls an auction including the progress of the auction as requested by seller system 102 and response to bids made by buyer system 103.

Seller system 102 includes web pages 105 that allow seller to enter and display information regarding auction events, inventory, and related administration.

Buyer system 103 includes web pages 106 that allow a buyer to display information regarding bidding as well as enter information commands in order to participate in bidding in auctions.

Figure 9:
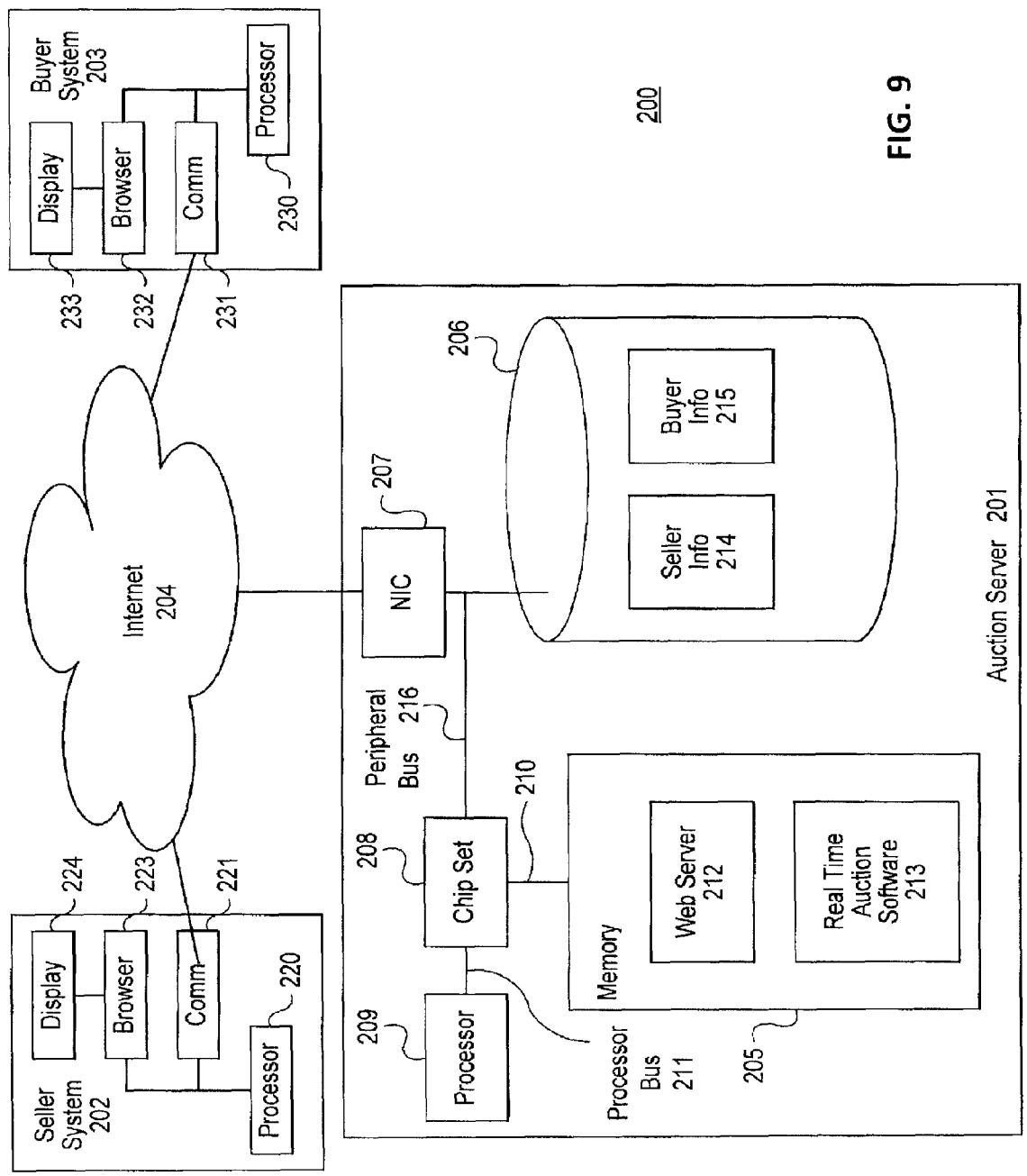
FIG. 9 is a more detailed block diagram of a system with a bidding tool, according to an embodiment of the invention.

FIG. 9 is a more detailed block diagram of a system with a bidding tool, according to an embodiment of the invention. Other tools and network configurations may be used according to other embodiments of the invention. In the system 200 shown are auction server 201, seller system 202, and buyer system 203. Auction server 201 is coupled to seller system 202 and buyer system 203 through Internet 204. FIG. 9 shows a more detailed view of architecture of the various components of the auction system. Auction sever 201 may include a processor 209 for processing instructions, such as an Intel Pentium™ processor, AMD Athlon™ processor or other processor. Processor 209 is coupled to chip set 208 by a processor bus 211. Chip set 208 is coupled to memory 205 by a memory bus 210 and manages access to memory 205 by processor 209. Chip set 208 is also coupled to peripheral bus 216. Peripheral 216 bus may comprise, for example, PCI, PCI-X, PCI Express, or other peripheral bus. Auction server 201 also includes one or more network interface cards 207 coupled to peripheral bus 216 for providing network interfaces to network, such as Internet 204. Storage 206, such as a disk array or other non-voltage storage, is also coupled to peripheral bus 216.

According to various embodiments, memory 205 and/or storage 206 may include various forms of storage or computer-readable memories such as, but not limited to, volatile memory (random access memory ("RAM"), non-volatile memory (read-only memory ("ROM")), EEPROM, disk, and/or other storage devices that may include one or more of magnetic, optical storage, or other media. The memory and/or storage on the auction server may be configured as a RAID (Redundant Array of Independent Disks) configuration to provide high reliability access to software and data.

Software may be loaded into memory 205 to help provide auction/bidding function for auction server 201. For example, web server 212 and real-time auction software 213 may be loaded into memory 205 and run by processor 209. Web server 212 provides web pages for the users to interact with in order to be provided with auction/bidding functions. For example, web server 212 may serve up web pages to seller system 202 and buyer system 203 in order to allow seller system 202 to manage inventory events and bidding and to allow buyer system 203 to view events and auction items to make bids and to participate in auctions. Storage 206 includes information about respective users, such as seller information 214 and buyer information 215. This information is used in order to manage the inventory of items for sale, configuration of bidding events, and the processing of real-time bidding. According to various embodiments of the invention, auction system 200 may include one or a plurality of auction servers 201 in various configurations and architectures to provide auctions and bidding functionality.

Seller system 202 and/or buyer system 203 may comprise computer systems coupled to a network such as Internet 204 according to an embodiment. As shown, seller system 202 includes processor 220 and software components such as browser 223 and communications software 221. Also included is a display 224 that allows a user to see information regarding auctions and to perform related administration. Buyer system 203 also includes a processor 230, communication software 231, browser 232, and display 233. Various browser software or other software or functionality to provide user interaction may be used in buyer and seller systems. For example, browsers may include, but are not limited to, Internet Explorer, Netscape browser, Firefox browser, Safari browser or other browser. Alternatively, other user interface software not including a browser may be used.

Software such as web server 212 and real-time auction software 213 may be stored in storage 206 or other storage and may be loaded into memory 205 for manipulation by processor 209 according to an embodiment of the invention. Portions of data such as seller information 214 and buyer information 215 may be loaded into data structures in memory 205 or other storage for manipulation by processor 209 in accordance with software such as web server 212 and real-time auction software 213. Web server 212 includes an operating system for managing system resources, such as Microsoft Windows XP, 2000, 98, or NT, Apple OS, Linux, or other operating systems as well as applications software running on top of the operating systems for implementing an HTML server or other server. Information stored in storage 206 may be stored in various forms of database arrangements and may contain cross references or links to one another to allow information to be queried and retrieved. In an example embodiment, the information is stored in databases, such as relational databases, and may be queried using structured query language (SQL) or other mechanism.

The system may include a secure connection or connections. For example, in an embodiment of the invention, the entire bidding operation of the system operates on a secure connection or connections. Various different technologies may be used to provide a secure connection, such as encryption with, for example, public key and private key encryption. The system may be set up over a virtual private network (VPN).

In an example embodiment, a seller operates seller system 202 through browser 223, communications software 221, and display 224 to set up seller inventory and seller events in seller information storage 214. The seller-user also manages the events and bidding through seller system 202, which communicates via Internet 204 with web server 212.

Buyer system 203 interacts with a buyer user, allowing the buyer user to view items and events including the items for auction. The interaction is provided to the buyer user through display 233, browser 232, and communications software 231, which are controlled by processor 230. Buyer system in turn communicates with auction server 201 via Internet 204. Web server 212 in turn provides buyer system 203 with graphical interface pages which may be displayed on display 233.

An embodiment of the invention is directed to a method for computer network-based sale of vehicles. An access group data structure is created. The access group data structure includes structure that defines association of web sites, users and vehicles associated with an access group. In response to receiving instruction to link the access to vehicles, the access group data structure is updated to reflect linking of the access group to the vehicles. In response to receiving instruction to link the access group to web sites, the access group data structure us updated to reflect linking of the access group to the web sites, and in response to receiving instruction to link the access group to users, the access group data structure to reflect linking of the access group to the users. Whether vehicles are visible on respective web sites is controlled based on the access group, and access by the user is allowed to respective items in the access group based on whether a user is associated with the access group.

According to an embodiment, the respective web sites in the group of web sites are differently branded and have different uniform resource locators (URLs). A length of time may be provided for sale of vehicles in the access group. In response to a user's request to search for vehicles, vehicles in the access group associated with the user may be searched.

An embodiment may include receiving and processing a request, from a user in the respective access group, to purchase a vehicle in a respective access group, after determining association of the user and vehicle to the access group. An embodiment may also include receiving and processing a request, from a user in the respective access group, to bid on a vehicle in a respective access group, after determining association of the user and vehicle to the access group.

According to an embodiment, a request is received from a user in the respective access group to buy a vehicle in a respective access group, and the user is prevented from buying the user's own vehicle. An embodiment may include displaying a listing of a set of vehicles for sale for a user and providing an option to remove vehicles from the set of vehicles for sale. An option may be provided to allow the user to sell a vehicle immediately at a current highest bid. An option may be provided to allow the user to view confirmed bids, and an option may be provided to allow the user to view offers placed on a vehicle.

Another embodiment includes providing an access group object, wherein the access group object includes properties that define association of web sites, users and vehicles associated with an access group. The access group object is configured to associate the access group to the vehicles, to associate the access group to the web sites, to associate the access group to the users, to associate the access group to the users, and to associate respective conditions of sale with the access group. The conditions of sale are applicable to sale of vehicles in the access group. The access group object is used to control whether vehicles are visible on respective web sites. Based on whether a user is associated with the access group, access by the user to respective items in the access group is allowed. Terms are provided based on the conditions of sale associated with the access group.

The conditions of sale may include pricing and settlement preferences. The conditions of sale may include settlement options, opening bid, and/or buy price, according to various embodiments.

An embodiment is directed to a computerized system for vehicle sale including a web server that serves web sites including a plurality of vehicle detail pages; a host database including descriptions of vehicles including configuration and condition; a first module and a second module; and logic that controls access to the vehicles provided by the second module based on the access group data structure. The first module may include an interface that creates an access group data structure, wherein the access group data structure includes structure that defines association of web sites, users and vehicles associated with an access group, an interface that links the access group to the vehicles, an interface that links the access group to the web sites, and an interface that links the access group to the users. The second module may include workflow that allows for listing of vehicles, a control that allows control of sites on which vehicles can be listed, and a control that allows control of sale.

The computerized system may include logic that controls a vehicle lifecycle including length of time a vehicle is visible in a set of iterations, logic that processes searches of vehicles, a manage listings interface that allows a seller user to view and manage vehicles listed for sale by the seller, and/or logic listing vehicles for auction, according to various embodiments.

An embodiment is directed to a method for computer network-based sale of vehicles including creating a data structure representing a vehicle, a data structure representing a condition of the vehicle, and a data structure for pictures of the vehicle. The data structure representing a vehicle is associated with a data structure representing the description of the vehicle. The data structure representing the description of the vehicle, the data structure representing a condition of the vehicle, and the data structure for pictures of the vehicle are updated. Pricing, fee and settlement preferences are set. The data structure representing the vehicle is associated with an access group data structure. The access group data structure includes structure that defines association of web sites, users and vehicles associated with an access group. In response to receiving instruction to link the access to vehicles, the access group data structure is updated to reflect linking of the access group to the vehicles. In response to receiving instruction to link the access group to web sites, the access group data structure is updated to reflect linking of the access group to the web sites, and in response to receiving instruction to link the access group to users, the access group data structure is updated to reflect linking of the access group to the users. Based on the access group, whether vehicles are visible on respective web sites is controlled, and based on whether a user is associated with the access group, access by the user to respective items in the access group is allowed.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number, respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

What is claimed is:

1. A method for computer network-based sale of vehicles, the method comprising:
    creating an access group data structure, wherein the access group data structure includes structure that defines association of web sites, users and vehicles associated with an access group;
    in response to receiving instruction to link the access group to vehicles, updating the access group data structure to reflect linking of the access group to the vehicles;
    in response to receiving instruction to link the access group to web sites, updating the access group data structure to reflect linking of the access group to the web sites;
    in response to receiving instruction to link the access group to users, updating the access group data structure to reflect linking of the access group to the users;
    based on the access group, controlling whether vehicles are visible on respective web sites; and
    based on whether a user is associated with the access group, allowing access by the user to respective items in the access group, wherein the respective items comprise a plurality of the vehicles visible on one or more of the web sites.

2. The method of claim 1, wherein the respective web sites in the group of web sites are differently branded and have different uniform resource locators (URLs).

3. The method of claim 1, including providing a length of time for sale of the vehicles in the access group.

4. The method of claim 1, including, in response to a user's request to search for vehicles, searching the vehicles in the access group associated with the user.

5. The method of claim 1, including receiving and processing a request, from a user in the respective access group, to purchase a vehicle in a respective access group, after determining association of the user and vehicle to the access group.

6. The method of claim 1, including receiving and processing a request from a user in the respective access group, to bid on a vehicle in a respective access group, after determining association of the user and vehicle to the access group.

7. The method of claim 1, including,
    receiving a request, from a user in the respective access group, to buy a vehicle in a respective access group, and
    preventing the user from buying the user's own vehicle.

8. The method of claim 1, including,
    displaying a listing of a set of vehicles for sale for a user; and
    providing an option to remove vehicles from the set of vehicles for sale.

9. The method of claim 1, including providing an option to allow the user to sell a vehicle immediately at a current highest bid.

10. The method of claim 1, including:
    providing an option to allow the user to view confirmed bids; and
    providing an option to allow the user to view offers placed on a vehicle.

11. A method for computer network-based sale of vehicles, the method comprising:
    providing an access group object, wherein the access group object includes properties that define association of web sites, users and vehicles associated with an access group;
    configuring the access group object to associate the access group to the vehicles;
    configuring the access group object to associate the access group to the web sites;
    configuring the access group object to associate the access group to the users;
    configuring the access group object to associate respective conditions of sale with the access group, wherein the conditions of sale are applicable to sale of vehicles in the access group;
    using the access group object to control whether vehicles are visible on respective web sites; and
    based on whether a user is associated with the access group,
    allowing access by the user to respective items in the access group, wherein the respective items comprise a plurality of the vehicles visible on one or more of the web sites, and
    providing terms based on the conditions of sale associated with the access group.

12. The method of claim 11, wherein the conditions of sale include pricing and settlement preferences.

13. The method of claim 11, wherein the conditions of sale include settlement options.

14. The method of claim 11, wherein the conditions of sale include an opening bid.

15. The method of claim 11, wherein the conditions of sale include buy price.

16. A computerized system for vehicle sale comprising:
    a web server that serves web sites including a plurality of vehicle detail pages;
    a host database including descriptions of vehicles including configuration and condition;
    a first module including,
        an interface that creates an access group data structure, wherein the access group data structure includes structure that defines association of web sites, users and vehicles associated with an access group,
        an interface that links the access group to the vehicles,
        an interface that links the access group to the web sites, and an interface that links the access group to the users; and
a second module including,
workflow that allows for listing of vehicles,
a control that allows control of sites on which vehicles can be listed, and
a control that allows control of sale; and
logic that controls access to the vehicles provided by the second module based on the access group data structure, wherein the access to the vehicles comprises access to a plurality of the vehicles displayed on one or more of the web sites.

17. The computerized system of claim 16, including logic that controls a vehicle lifecycle including length of time a vehicle is visible in a set of iterations.

18. The computerized system of claim 17, including logic that processes searches of vehicles.

19. The computerized system of claim 18, including a manage listings interface that allows a user to view and manage vehicles listed for sale by the user.

20. The computerized system of claim 19, including logic listing vehicles for auction.

21. A method for computer network-based sale of vehicles, the method comprising:
creating a data structure representing a vehicle, the data structure representing a vehicle being associated with a data structure representing a description of the vehicle, a data structure representing a condition of the vehicle, and a data structure for pictures of the vehicle;
updating the data structure representing the description of the vehicle;
updating the data structure representing the condition of the vehicle;
updating the data structure for the pictures of the vehicle;
setting pricing, fee and settlement preferences;
associating the data structure representing the vehicle with an access group data structure, wherein the access group data structure includes structure that defines association of web sites, users and vehicles associated with an access group;
in response to receiving instruction to link the access to vehicles, updating the access group data structure to reflect linking of the access group to the vehicles;
in response to receiving instruction to link the access group to web sites, updating the access group data structure to reflect linking of the access group to the web sites;
in response to receiving instruction to link the access group to users, updating the access group data structure to reflect linking of the access group to the users;
based on the access group, controlling whether vehicles are visible on respective web sites; and
based on whether a user is associated with the access group, allowing access by the user to respective items in the access group, wherein the respective items comprise a plurality of the vehicles visible on one or more of the web sites.

22. A computer-based vehicle sale apparatus, the apparatus comprising:
means for creating an access group data structure, wherein the access group data structure includes structure that defines association of web sites, users and vehicles associated with an access group;
means for, in response to receiving instruction to link the access group to vehicles, updating the access group data structure to reflect linking of the access group to the vehicles;
means for, in response to receiving instruction to link the access group to web sites, updating the access group data structure to reflect linking of the access group to the web sites;
means for, in response to receiving instruction to link the access group to users, updating the access group data structure to reflect linking of the access group to the users;
means for, based on the access group, controlling whether vehicles are visible on respective web sites; and
means for, based on whether a user is associated with the access group, allowing access by the user to respective items in the access group, wherein the respective items comprise a plurality of the vehicles visible on one or more of the web sites.

* * * * *